(12) United States Patent
Hakeem

(10) Patent No.: US 11,805,210 B2
(45) Date of Patent: Oct. 31, 2023

(54) METHOD FOR CHANGING SCAN SETTINGS IN A MULTI-FUNCTION PRINTER AND A MULTI-FUNCTION PRINTER THEREOF

(71) Applicant: TOSHIBA TEC KABUSHIKI KAISHA, Tokyo (JP)

(72) Inventor: Shaikshavali Hakeem, Karnataka (IN)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/679,849

(22) Filed: Feb. 24, 2022

(65) Prior Publication Data
US 2022/0272216 A1    Aug. 25, 2022

(30) Foreign Application Priority Data
Feb. 25, 2021 (IN) .............................. 202141008005

(51) Int. Cl.
| | | |
|---|---|---|
| *H04N 1/00* | (2006.01) | |
| *H04N 1/393* | (2006.01) | |
| *H04N 1/60* | (2006.01) | |
| *H04N 1/04* | (2006.01) | |

(52) U.S. Cl.
CPC ....... *H04N 1/00482* (2013.01); *H04N 1/0044* (2013.01); *H04N 1/04* (2013.01); *H04N 1/3935* (2013.01); *H04N 1/60* (2013.01); *H04N 2201/0094* (2013.01)

(58) Field of Classification Search
CPC .......... G06T 3/40; G06F 3/12; H04N 1/0044; H04N 1/00482; H04N 1/04; H04N 1/3935; H04N 1/60; H04N 2201/0094; H04N 1/00005; H04N 1/00034; H04N 1/00411; H04N 1/00708; H04N 1/00827; H04N 1/33307; H04N 1/40068; H04N 2201/0081; H04N 2201/33328; H04N 2201/33357; H04N 2201/33378
USPC ........................................................... 358/1.2
See application file for complete search history.

(56) References Cited

U.S. PATENT DOCUMENTS

| | | | |
|---|---|---|---|
| 7,898,680 B2 | 3/2011 | Misawa et al. | |
| 8,218,193 B2 * | 7/2012 | Kim ......................... | G06T 3/40 358/472 |
| 8,218,209 B2 * | 7/2012 | Kohara ............... | H04N 1/00005 358/448 |

(Continued)

*Primary Examiner* — Negussie Worku
(74) *Attorney, Agent, or Firm* — FOLEY & LARDNER LLP

(57) ABSTRACT

A method and apparatus are provided for changing scan settings to verify the size of a scanned document. The method includes displaying on a user interface of the apparatus, a size of the scanned document, scanned based on one or more scan settings. The method further includes receiving a user response relating to the size of the scanned document. The user response is indicative of whether the size of the scanned document is according to a target size. The apparatus provides at least one of color information or resolution information to at least one of a device associated with the user or the user interface, when the size of scanned document is greater than the target size. The user changes one of color and resolution settings. The method includes scanning the document with one of changed color or resolution settings to obtain the scanned document with the target size.

15 Claims, 7 Drawing Sheets

(56) References Cited

U.S. PATENT DOCUMENTS

| | | | |
|---|---|---|---|
| 9,681,013 B2* | 6/2017 | Gopalakrishnan | ............................ H04N 1/00827 |
| 10,469,713 B2* | 11/2019 | Kim | ...................... H04N 1/6086 |
| 11,455,135 B2* | 9/2022 | Okumura | .............. G06F 3/1208 |
| 2006/0098249 A1* | 5/2006 | Lee | ...................... H04N 1/1013 358/497 |
| 2008/0025642 A1* | 1/2008 | Kim | .......................... G06T 3/40 715/705 |
| 2009/0106643 A1* | 4/2009 | Kim | ...................... G06F 40/134 715/234 |
| 2017/0111530 A1* | 4/2017 | Gopalakrishnan | ....... H04N 1/04 |
| 2019/0058805 A1* | 2/2019 | Ito | ...................... H04N 1/00816 |
| 2019/0098154 A1* | 3/2019 | Baba | .................. H04N 1/0044 |
| 2022/0058413 A1* | 2/2022 | Migita | .................. G06V 10/993 |
| 2022/0171580 A1* | 6/2022 | Hayashi | ................ G06F 3/1208 |

* cited by examiner

METHOD FOR CHANGING SCAN SETTINGS IN A MULTI-FUNCTION PRINTER AND A MULTI-FUNCTION PRINTER THEREOF

CROSS-REFERENCE TO RELATED APPLICATION

This application is based upon and claims the benefit of priority from Indian Patent Application No. 202141008005, filed on Feb. 25, 2021, the entire contents of which are incorporated herein by reference.

TECHNICAL FIELD

The present subject matter generally relates to a Multi-Function Printer (MFP). More particularly, but not exclusively, the present disclosure discloses a method for changing scan settings in a Multi-Function Printer (MFP) to verify a size of a scanned document.

BACKGROUND

A Multifunction Printer/Peripheral (MFP) is a device that performs a variety of functions that would otherwise be carried out by separate peripheral devices. The MFP may include a printer, a scanner, a copier, and a fax machine. Conventionally, users make use of MFP for scanning a document. The scanned documents are generally used to upload in some portal including a government organization portal while seeking various services. In certain scenario, the portals require the user to adhere with size limitations of the document which is being uploaded in the portal due to the size constraint. With the existing MFP scan settings, the user executes a scan operation with specific resolution and color settings. After the scan operation, the user may determine that scanned document is of larger memory size than expected target size (size limitation). In order to determine the scanned document size, the user should access the storage location where the scanned document is stored upon a scan operation and verify the size of the scanned document. If the size is larger than the expected target size, the user should perform a fresh scan operation once again with changed settings to get the scanned document of a lesser size. This kind of repetitive operations makes users unhappy, is time consuming, and blocks resources, as for example another user who wants to make use of the same MFP has to wait for a longer duration before accessing the MFP and hence the user experience is deteriorated.

The information disclosed in this background of the disclosure section is only for enhancement of understanding of the general background of the disclosure and should not be taken as an acknowledgement or any form of suggestion that this information forms the prior art already known to a person skilled in the art.

SUMMARY

Disclosed herein is a method for changing scan settings in a Multi-Functional Printer (MFP) to verify size of a scanned document. The method comprises displaying, by the MFP on a User Interface (UI) of the MFP, size of a scanned document, which is scanned based on one or more scan settings. The method further comprises receiving a user response in response to the displayed size of the scanned document. The user response is indicative of whether the size of the scanned document is according to a target size by the user. Thereafter, the MFP provides at least one of color information or resolution information to at least one of a device associated with the user or to the UI, when the size of the scanned document is greater than the target size. The user changes one of color settings and the resolution settings in the one or more scan settings of the MFP using at least one of the color information and resolution information. Once one of the color settings and resolution changes are changed, the document is scanned with one of the changed color settings or resolution settings to obtain the scanned document with the target size.

Further, the present disclosure discloses a Multi-Function Printer (MFP) for changing scan settings to verify size of a scanned document. The MFP comprises a processor and a memory communicatively coupled to the processor. The memory stores the processor-executable instructions, which, on execution, causes the processor to display on a User Interface (UI) of the MFP, size of a scanned document, scanned based on one or more scan settings. Thereafter, the processor receives a user response in response to the displayed size of the scanned document. The user response is indicative of whether size of the scanned document is according to a target size by the user. Upon receiving the user response, the processor provides at least one of color information and resolution information to at least one of a device associated with the user and to the UI, when the size of the scanned document is greater than the target size. The user changes one of color settings and the resolution settings in the one or more scan settings of the MFP using the at least one of color information and/or resolution information. Once the user changes one of the color settings and/or the resolution settings, the processor scans the document with one of the changed color settings or resolution settings to obtain the scanned document with the target size.

Furthermore, the present disclosure discloses a non-transitory computer readable medium comprising processor executable instructions thereon, which cause a processor to operate. The operation of the processor comprises displaying size of a scanned document, which is scanned based on one or more scan settings. The operation further comprises receiving a user response in response to the displayed size of the scanned document. The user response is indicative of whether size of the scanned document is according to a target size by the user. Thereafter, the operation comprises providing by the MFP at least one of color information and resolution information to at least one of a device associated with the user and to the UI, when the size of the scanned document is greater than the target size. The user changes one of color settings and the resolution settings in the one or more scan settings of the MFP using the at least one of color information and resolution information. Once one of the color settings and resolution changes are changed, the operation comprises scanning the document with one of the changed color settings or resolution settings to obtain the scanned document with the target size.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1A:
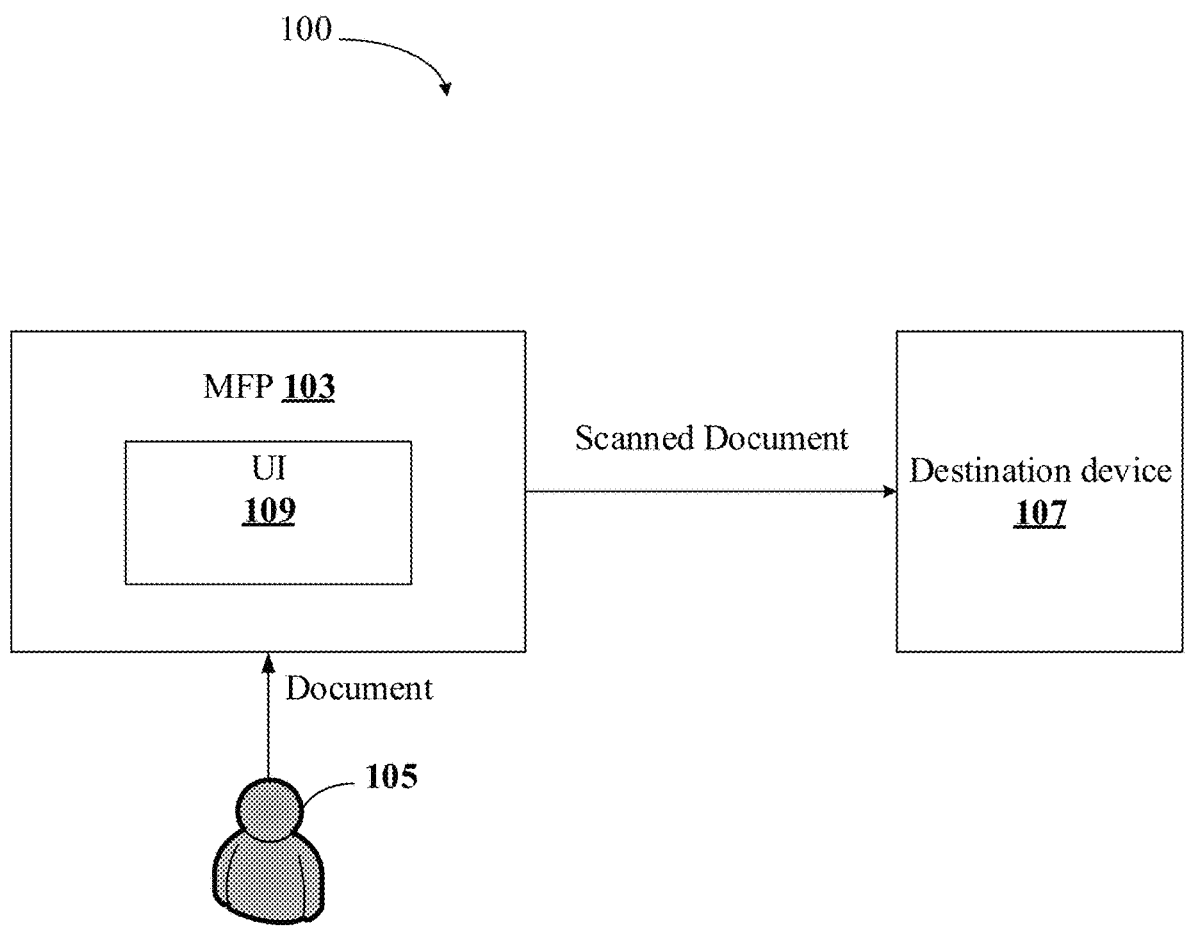
FIG. 1a illustrates an exemplary environment for changing scan settings in a Multi-Functional Printer (MFP) to verify size of a scanned document in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, at least one specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the scope of the disclosure.

The terms "comprises", "comprising", "includes", "including" or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration of embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1a illustrates an exemplary environment for changing scan settings in a Multi-Functional Printer (MFP) to verify the size of a scanned document in accordance with some embodiments of the present disclosure.

The environment 100 may include a Multi-Function Printer (MFP) 103, a user 105, and a destination device 107. In the present disclosure, the MFP is used for a scanning operation and illustrates how to verify the size of a scanned document. The MFP 103 may be referred to as an image forming apparatus. However, the MFP may be used for other operations which may include, but not limited to, printing and fax operations. The user 105 may use the MFP 103 for scanning a document. The document to be scanned may be provided to the MFP 103 and the user 105 may select one or more scan settings. The one or more scan settings may include, but not limited to, one or more of color settings, destination device information settings, resolution settings, or document size alert enable/disable settings. As an example, the color settings may be black and white or full color or an RGB combination. The resolution settings may be for example, 600 dpi or 300 dpi. The destination device information may include information of the destination 107 where the scanned document may be stored. As an example, the destination may be storage locations which may include, but not limited to, local storage of the MFP 103, remote server associated with the MFP 103, Universal Serial Bus (USB) and email ID (scan to email) and these storage locations may be accessed by a personal computer communicatively connected (wired or wireless) with the MFP 103. The document size alert enable setting may be selected when the user 105 may wish to receive notification of size of the scanned document. When the document size alert disable setting is selected, the MFP 103 may not notify the user 105 of size of the scanned document. Based on the one or more scan settings, the document may be scanned. If the user 105 has enabled "document size alert", then the size of the document may be displayed on the User Interface (UI) 109 of the MFP 103. If the user 105 has disabled "document size alert", then the document may be scanned based on one or more scan settings and the scanned document may be stored in the destination device 107.

In an embodiment, when the size of the scanned document is less than or equal to the target size according to the user 105, the user 105 may provide a response to indicate that the size of the scanned document is according to the target size and hence the scanned document may be stored in the destination device 107. However, when the size of the scanned document is greater than the target size according to the user 105, then the user 105 may provide a response to indicate that the size of the scanned document is not according to the target size.

Upon receiving the response, in one embodiment, the MFP 103 may display color information and resolution information to the UI 109. In another embodiment, the MFP 103 may provide the color information and the resolution information to a device associated with the user 105. As an example, the device may be a mobile phone. The color information comprises details of one or more color types affecting the size of the document such as black and white or full color and the resolution information comprises one or more resolutions such as 600 dpi, 300 dpi, or 100 dpi affecting the size of the document. The color information and the resolution information may facilitate the user 105 to optimize the size of the scanned document. When the color information and the resolution information is displayed on the UI 109 or on the device associated with the user 105, the user 105 may change one of color settings and the resolution settings in the one or more scan settings of the MFP 103, which receives an instruction to change such settings accordingly. As an example, the user 105 may change the resolution from 600 dpi to 300 dpi. Based on the changed resolution setting, the document may be scanned again to verify the size of the scanned document. If the size of the scanned document is according to the target size, then the scanned document may be stored in the destination device 107. In this manner, in the present disclosure, size of the scanned document is displayed on the UI 109 of the MFP 103. This facilitates the user 105 to judge the settings upfront and change the settings dynamically without having to move away from the MFP 103 for checking size of the scanned document. This also increases user experience and avoids repetitive scans to check the size of the scanned document and hence saves scan time.

Figure 1B:
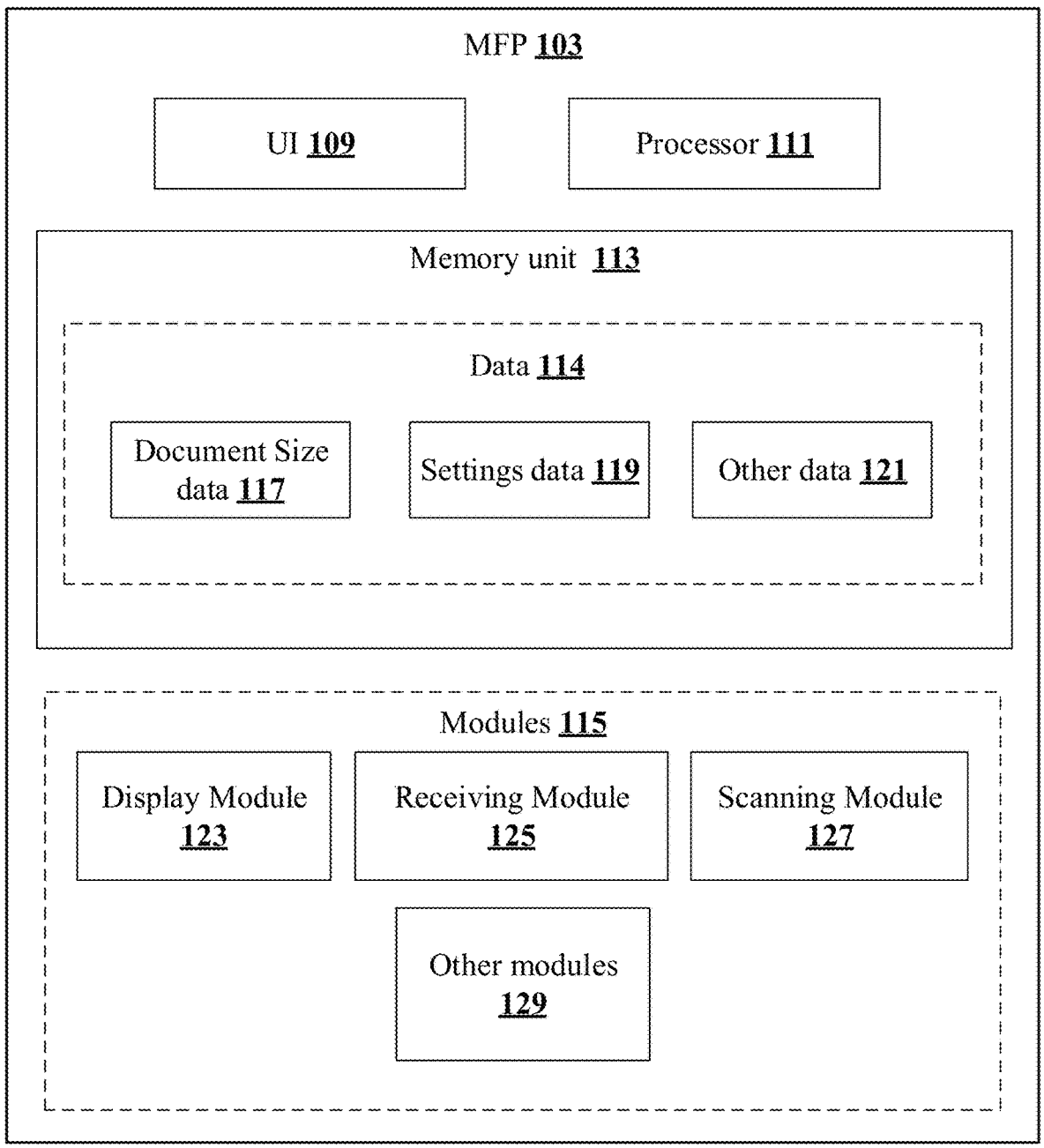
FIG. 1b shows a block diagram of an MFP in accordance with some embodiments of the present disclosure.

FIG. 1b shows a block diagram of MFP in accordance with some embodiments of the present disclosure.

As shown in FIG. 1b, the MFP 103 comprise a User Interface (UI) 109, a processor 111 and a memory unit 113. The UI 109 may be configured to receive one or more scan settings and to display at least one of color information and resolution information and the size of scanned document. The processor 111 may be configured to perform one or more functions of the MFP 103. In some implementations, the MFP 103 may include data 114 and modules 115 for performing various operations in accordance with embodiments of the present disclosure. In an embodiment, the data 114 may be stored within the memory unit 113 and may include, without limiting to, document size data 117, settings data 119 and other data 121.

In some embodiments, the data 114 may be stored within the memory unit 113 in the form of various data structures. Additionally, the data 114 may be organized using data models, such as relational or hierarchical data models.

In an embodiment, one or more modules 115 may process the data 114 of the MFP 103. In one implementation, the one or more modules 115 may be communicatively coupled to the processor 111 for performing one or more functions of the MFP 103. The modules 115 may include, without limiting to, a display module 123, a receiving module 125, a scanning module 127 and other modules 129.

As used herein, the term module 115 refers to an Application Specific Integrated Circuit (ASIC), an electronic circuit, a processor 111 (shared, dedicated, or group) and memory unit 113 that execute one or more software or firmware programs, a combinational logic circuit, and/or other suitable components that provide the described functionality. In an embodiment, the other modules 129 may be used to perform various miscellaneous functionalities of the MFP 103. It will be appreciated that such modules 115 may be represented as a single module or a combination of different modules. Furthermore, a person of ordinary skill in the art will appreciate that in an implementation, the one or more modules may be stored in the memory unit 113, without limiting the scope of the disclosure. The said modules 115 when configured with the functionality defined in the present disclosure will result in a novel hardware.

In an embodiment, the display module 123 may be configured to display one or more scan settings on the UI 109 of the MFP 103. As an example, the one or more scan settings comprises color settings, destination device information settings, resolution settings, and a document size alert enable/disable settings. The display module 123 may also be configured to display the size of a scanned document on the UI 109 based on the one or more scan settings. The one or more scan settings may be stored as settings data 119 in the memory unit 113.

In an embodiment, the receiving module 125 may be configured to receive a user response in response to the displayed size of the scanned document. Once the document is scanned, the size of the scanned document may be displayed on the UI 109. The size of the scanned document may be stored in the memory unit 113 as document size data 117. If the size of the scanned document is according to target size indicated by the user 105, then the MFP 103 may store the scanned document in the destination device 107.

However, if the size of the scanned document greater than the target size then the receiving module 125 may receive a user response indicating that the size of the scanned document is greater than the target size. Upon receiving the user response that size of the scanned document is greater than the target size, the MFP 103 may provide at least one of color information or resolution information to at least one of a device associated with the user 105 and to the UI 109. The color information comprises details of one or more color types affecting the size of the document, and the resolution information comprises one or more resolutions affecting the size of the document. The user 105 may change one of the color settings or the resolution settings using the at least one of color information and the resolution information. When the user 105 changes one of the color settings or the resolution settings, based on the changed color settings or the resolution settings, the scanning module 127 may scan the document. If the size of the scanned document is according to the target size by the user 105, the scanned document may be stored in the destination device 107.

Exemplary Scenario.

Figure 2A:
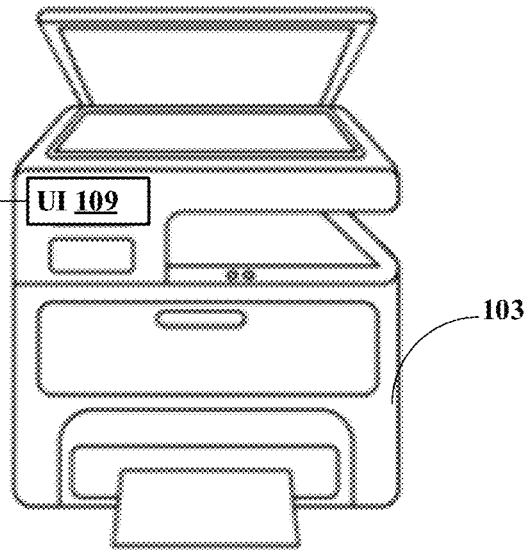
FIGS. 2a, 2b, 2c, 2d and 2e illustrate an exemplary embodiment for changing scan settings in a Multi-Functional Printer (MFP) to verify the size of a scanned document in accordance with some embodiments of the present disclosure.
Figure 2B:
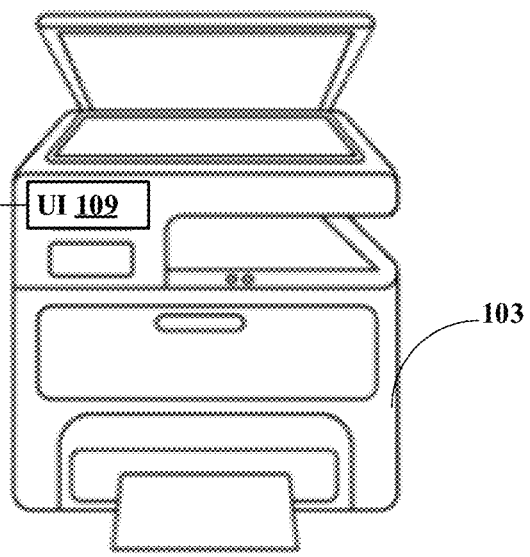
Figure 2C:
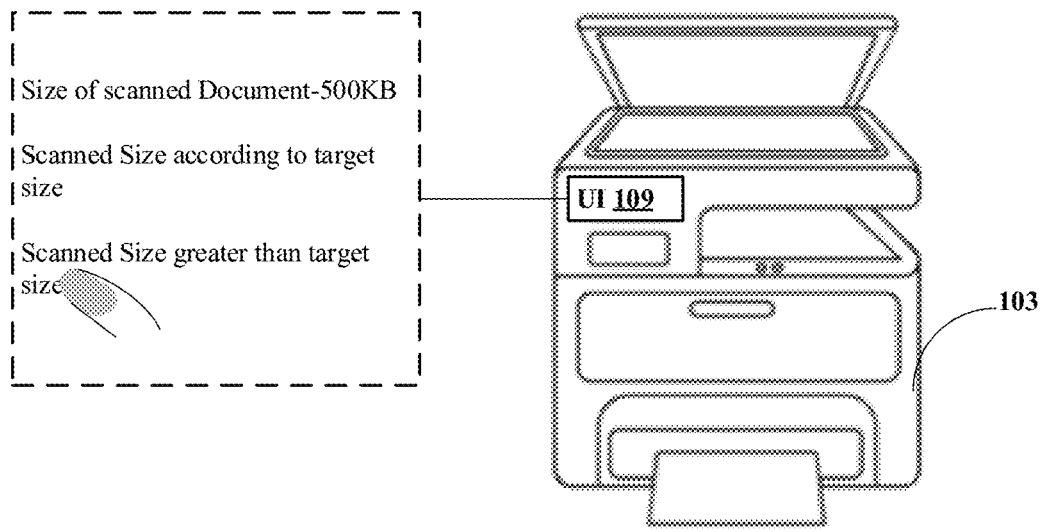
Figure 2D:
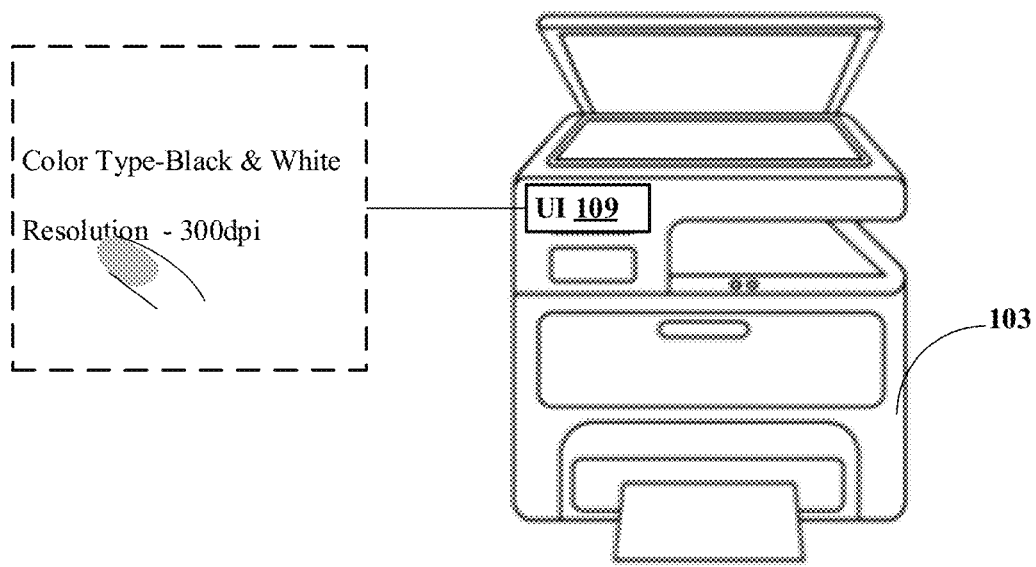
Figure 2E:
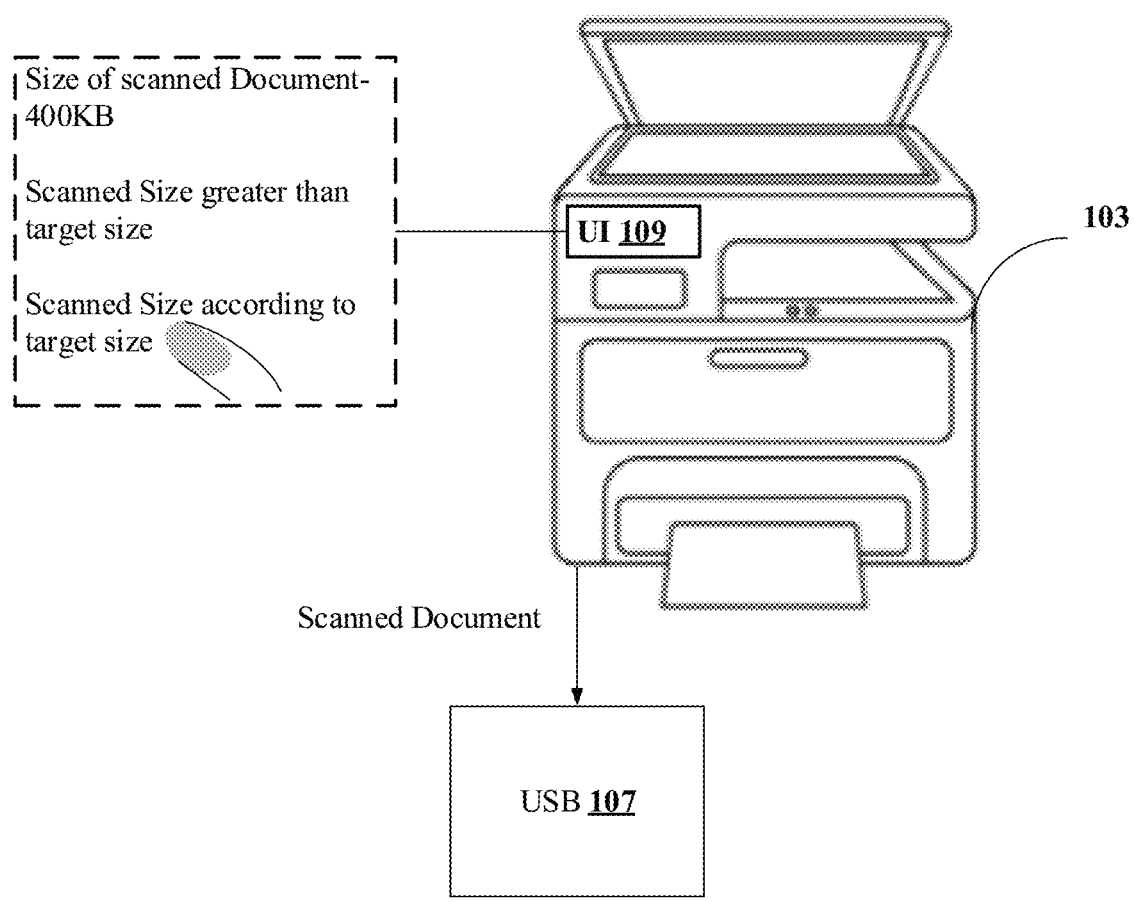

As an example, the user 105 may scan a document in the MFP 103 by setting one or more scan settings. The one or more scan settings may be provided by the user 105 through the UI 109. As an example, the one or more scan settings input by the user 105 may be color settings as "Full color", resolution settings as "600 dpi", destination as "USB" and document size alert as "enable" as shown in FIG. 2a. Once the user 105 provides the one or more scan settings, the document may be scanned using the one or more scan settings. Thereafter, the size of the scanned document may be displayed on the UI 109 as 500 KB as shown in FIG. 2b. The MFP 103 may also display on the UI 109 to check if the size of the scanned document is according to target size by the user 105 or not. So, the options/icons displayed on the UI 109 may be "Scanned Size according to target size" or "Scanned Size is greater than target size". If the size of the scanned document is according to the target size, the user 105 may select the option "Size according to target size". In this scenario, the scanned document is stored in the destination device 107 which is USB. As an example, the user 105 may select the option "scanned size greater than target size" as shown in FIG. 2c when the scanned size greater than the target size. At this stage, the scanned document is either discarded or may be stored for later use while simultaneously reinitiating the new scan operation. As an example, the target size may be 450 KB. Therefore, the MFP 103 displays on the UI 109 a color information or resolution information or both color and resolution information. As an example, the MFP 103 displays color type as "Black & White" and resolution as 300 dpi as shown in FIG. 2d. The MFP 103 displays these options/icons to the user 105 to optimize the size of the scanned document. As an example, the user 105 selects the option/icon "resolution—300 dpi" as shown in FIG. 2*d*. Based on the selected resolution settings, the document will be scanned again, and the size of the scanned document will be displayed on the UI 109. The size of the scanned document is 400 KB which is less than the target size 450 KB as shown in FIG. 2*e*. Therefore, the user 105 will select the option/icon "scanned size according to target size" upon which the scanned document will be stored in the USB 107 as shown in FIG. 2*e*.

Figure 3:
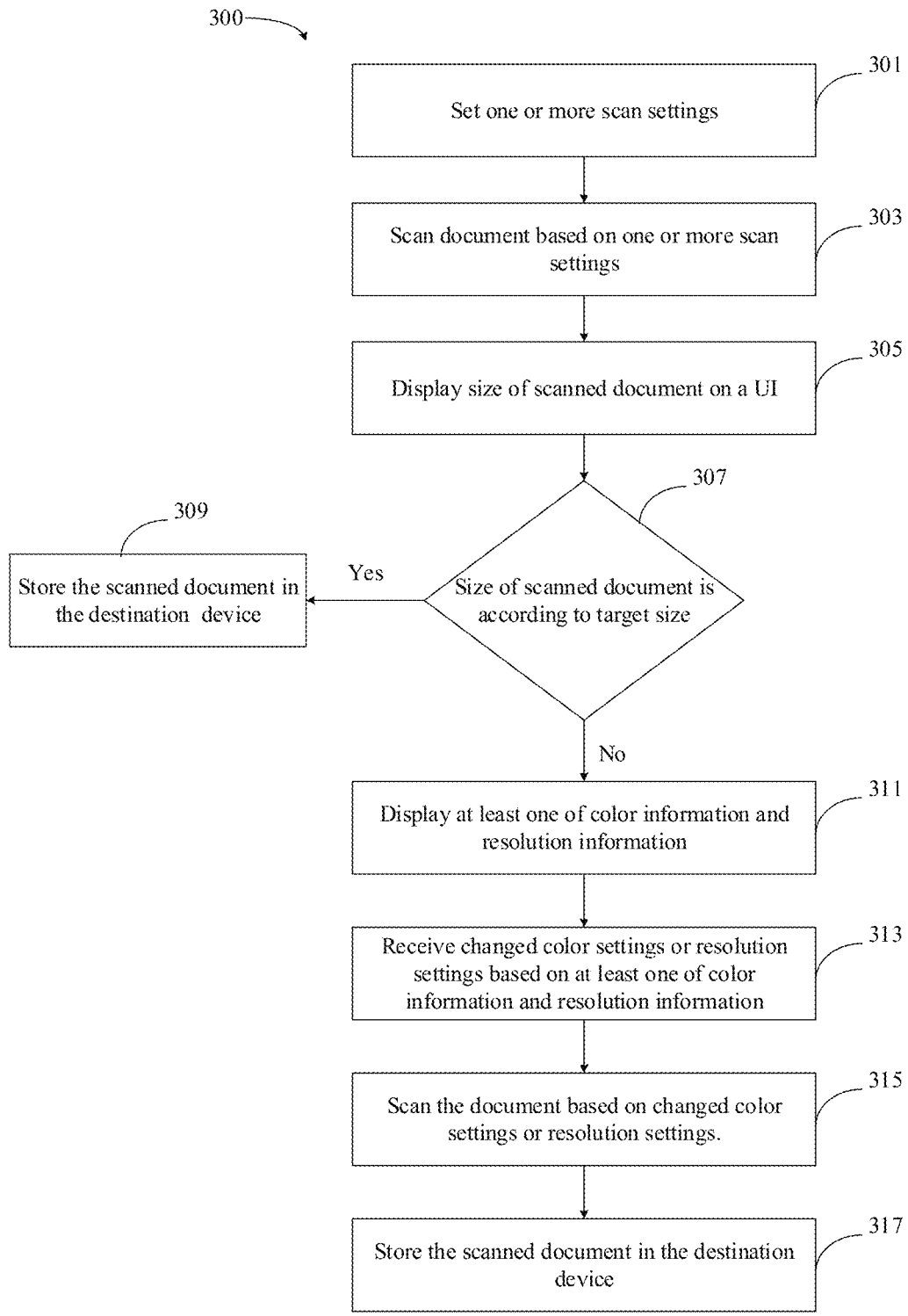
FIG. 3 shows a flowchart illustrating a method for changing scan settings in a Multi-Functional Printer (MFP) to verify the size of a scanned document in accordance with some embodiments of the present disclosure.

FIG. 3 shows a flowchart illustrating a method for changing scan settings to verify the size of a scanned document in accordance with some embodiments of the present disclosure.

As illustrated in FIG. 3, the method 300 comprises one or more blocks for changing scan settings to verify size of a scanned document using the MFP 103. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 301, the method may comprise providing one or more scan settings for scanning a document. As an example, the one or more scan settings may include color settings, destination device information settings, resolution settings, and document size alert enable/disable settings. Based on the one or more scan settings, the document may be scanned at block 303.

At block 305, the method may comprise displaying size of the scanned document on the UI 109 based on the one or more scan settings.

At block 307, the method may comprise determining whether the size of the scanned document is according to target size as per the user 105. If the size of the scanned document is according to target size indicated by the user 105, then the MFP 103 may store the scanned document in the destination device 107 at block 309. However, if the size of the scanned document is greater than the target size then the method proceeds to block 311, wherein the MFP 103 displays on the UI 109 at least one of color information or resolution information. The color information comprises details of one or more color types affecting the size of the document and the resolution information comprises one or more resolutions affecting the size of the document.

At block 313, the method may comprise receiving a changed one of color settings or the resolution settings using at least one of the color information and the resolution information. When the user 105 changes one of the color settings or the resolution settings, the document may be scanned using the changed one of color settings or the resolution settings at block 315. When the size of the scanned document is according to the target size indicated by the user 105, the scanned document may be stored in the destination device 107 at block 317.

Computer System

Figure 4:
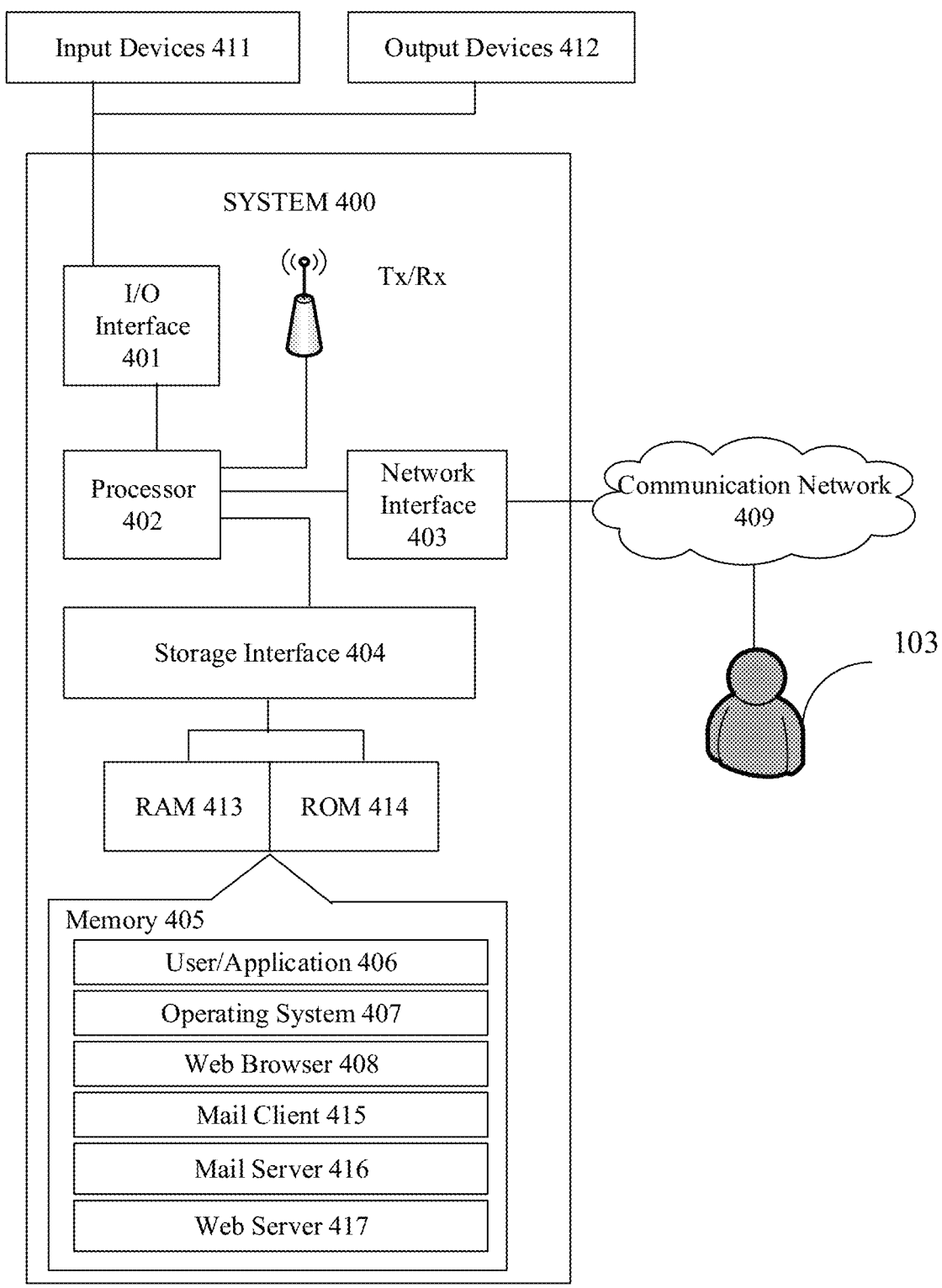
FIG. 4 illustrates a block diagram of an exemplary computer system for implementing embodiments consistent with the present disclosure.

FIG. 4 illustrates a block diagram of an exemplary computer system 400 for implementing embodiments consistent with the present disclosure. In an embodiment, the computer system 400 may be a MFP 103 for changing scan settings to verify size of a scanned document. The computer system 400 may include a central processing unit ("CPU" or "processor") 402. The processor 402 may comprise at least one data processor for executing program components for executing user or system-generated business processes. The processor 402 may include specialized processing units such as integrated system (bus) controllers, memory management control units, floating point units, graphics processing units, digital signal processing units, etc. The processor 402 may be disposed in communication with an electronic device that is a combination of a radio transmitter and a receiver (Tx/Rx), which can both transmit and receive radio waves using an antenna, for communication purposes.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n /b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface 401, the computer system 400 may communicate with one or more I/O devices 411 and 412. In some implementations, the I/O interface 401 may be the UI 109 which is used for displaying scan settings, displaying size of scanned document and to receive a user response.

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc.

The communication network 409 can be implemented as one of the several types of networks, such as intranet or Local Area Network (LAN) and such within the organization. The communication network 409 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc.

In some embodiments, the processor 402 may be disposed in communication with a memory 405 (e.g., RAM 413, ROM 414, etc. as shown in FIG. 4) via a storage interface 404. The storage interface 404 may connect to memory 405 including, without limitation, memory drives, removable disc drives, etc., employing connection protocols such as a Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user/application 406, an operating system 407, a web browser 408, mail client 415, mail server 416, web server 417 and the like. In some embodiments, computer system 400 may store user/application data 406, such as the data, variables, records, etc. as described herein. Such databases may be implemented as fault-tolerant, relational, scalable, secure databases such as Oracle® or Sybase®.

The operating system 407 may facilitate resource management and operation of the computer system 400. Examples of operating systems include, without limitation, APPLE MACINTOSHR OS X, UNIXR, UNIX-like system distributions (e.g., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLER IOS™, GOOGLER ANDROID™, BLACKBERRY® OS, or the like. A user interface may facilitate display, execution, interaction, manipulation, or operation of program components through textual or graphical facilities. For example, user interfaces may provide computer interaction interface elements on a display system operatively connected to the computer system 400, such as cursors, icons, check boxes, menus, windows, widgets, etc. Graphical User Interfaces (GUIs) may be employed, including, without limitation, APPLE MACINTOSH® operating systems, IBM™ OS/2, MICROSOFT™ WINDOWS™ (XP™, VISTA™/7/8, 10 etc.), Unix® X-Windows, web interface libraries (e.g., AJAX™, DHTML™, ADOBE® FLASH™, JAVASCRIPT™, JAVA™, etc.), or the like.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

In an embodiment, the present disclosure provides a method and alVIFP for dynamically changing scan settings to verify size of a scanned document without storing the scan document.

In an embodiment, in the present disclosure size of the scanned document is displayed on the UI of the MFP. This facilitates the user to judge the settings upfront without having to move away from the MFP for checking size of scanned document. The scan settings can be changed in real-time by user, without the requirement of storing the scanned document. This increases the user experience and also avoids repetitive scans to check the size of the scanned document.

In an embodiment, the present disclosure discloses the aspect of changing one of color or resolution settings to optimize the size of scanned document. This facilitates the user in making a quick decision for changing one of color or resolution setting for changing size of the scanned document.

The terms "an embodiment", "embodiment", "embodiments", "the embodiment", "the embodiments", "one or more embodiments", "some embodiments", and "one embodiment" mean "one or more (but not all) embodiments" unless expressly specified otherwise.

The terms "including", "comprising", "having" and variations thereof mean "including but not limited to", unless expressly specified otherwise. The enumerated listing of items does not imply that any or all the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for changing one or more scan settings of an image forming apparatus to verify a size of a scanned document, the method comprising:
   displaying, by the image forming apparatus on a user interface of the image forming apparatus, the size of the scanned document, scanned based on the one or more scan settings;
   receiving, by the image forming apparatus, a user response in response to the displayed size of the scanned document,
   the user response being indicative of whether the size of the scanned document is in accordance with a target size indicated by the user, the size of the scanned document being a file size which is displayed numerically;

providing, by the image forming apparatus, at least one of color information or resolution information to at least one of a device associated with the user or the user interface, when the size of the scanned document is greater than the target size;

receiving an instruction from the user to change one of color settings or the resolution settings in the one or more scan settings of the image forming apparatus using the at least one of color information or resolution information; and scanning, by the image forming apparatus, the document with the one of the changed color settings or resolution settings to obtain the scanned document with the target size.

2. The method of claim 1, wherein the size of the scanned document is displayed when a document size alert is enabled in the one or more scan settings.

3. The method of claim 1, wherein the one or more scan settings comprise one or more of color settings, destination device information settings, resolution settings, or document size alert enable/disable settings.

4. The method of claim 1, wherein the scanned document is stored in a destination device indicated by the user in the one or more scan settings when the size of the scanned document is less than or equal to the target size.

5. The method of claim 1, wherein the color information comprises information relating to one or more color types affecting the size of the document, and the resolution information comprises one or more resolutions affecting the size of the document.

6. An image forming apparatus for changing one or more scan settings to verify a size of a scanned document, the image forming apparatus comprising:

a processor;

a memory communicatively coupled to the processor, the memory configured to store processor-executable instructions, which, on execution, cause the processor to:

display on a user interface of the image forming apparatus, the size of a scanned document, scanned based on the one or more scan settings;

receive a user response in response to the displayed size of the scanned document; the user response being indicative of whether the size of the scanned document is in accordance with a target size indicated by a user, the size of the scanned document being a file size which is displayed numerically;

provide at least one of color information or resolution information to at least one of a device associated with the user or the user interface, when the size of the scanned document is greater than the target size;

receive an instruction from the user to change one of color settings or resolution settings in the one or more scan settings of the image forming apparatus using the at least one of color information or resolution information; and scan the document with one of the changed color settings or the changed resolution settings to obtain the scanned document with the target size.

7. The image forming apparatus of claim 6, wherein the processor displays the size of the scanned document when a document size alert is enabled in the one or more scan settings.

8. The image forming apparatus of claim 6, wherein the one or more scan settings comprise one or more of color settings, destination device information, resolution settings, or document size alert enable/disable settings.

9. The image forming apparatus of claim 6, wherein the processor stores the scanned document in a destination device indicated by the user in the one or more scan settings when the size of the scanned document is less than or equal to the target size.

10. The image forming apparatus of claim 6, wherein the color information comprises information relating to one or more color types affecting the size of the document and the resolution information comprises one or more resolutions affecting the size of the document.

11. A non-transitory computer readable medium comprising processor executable instructions thereon, which, when executed, cause a processor to perform operations comprising:

displaying a size of a scanned document, scanned based on one or more scan settings;

receiving a user response in response to the displayed size of the scanned document, the user response being indicative of whether the size of the scanned document is in accordance with a target size indicated by a user, the size of the scanned document being a file size which is displayed numerically;

providing at least one of color information or resolution information to at least one of a device associated with the user or a user interface, when the size of the scanned document is greater than the target size;

receiving an instruction from the user to change one of color settings or resolution settings in the one or more scan settings of the image forming apparatus using the at least one of the color information or the resolution information; and scanning the document with one of the changed color settings or the changed resolution settings to obtain the scanned document with the target size.

12. The non-transitory computer readable medium of claim 11, wherein the operations further comprise displaying the size of the scanned document when a document size alert is enabled in the one or more scan settings.

13. The non-transitory computer readable medium of claim 11, wherein the one or more scan settings comprise one or more of color settings, destination device information settings, resolution settings, or document size alert enable/disable settings.

14. The non-transitory computer readable medium of claim 11, wherein the operations further comprise storing the scanned document in a destination device indicated by the user in the one or more scan settings when the size of the scanned document is less than or equal to the target size.

15. The non-transitory computer readable medium of claim 11, wherein the color information comprises information relating to one or more color types affecting the size of the document, and the resolution information comprises one or more resolutions affecting the size of the document.

* * * * *